United States Patent
Dan et al.

(10) Patent No.: US 12,249,500 B1
(45) Date of Patent: Mar. 11, 2025

(54) LIGHT-EMITTING GAS RECOVERY METHOD AND LIGHT-EMITTING GAS RECOVERY APPARATUS

(71) Applicant: Ushio Denki Kabushiki Kaisha, Tokyo (JP)

(72) Inventors: Masashi Dan, Tokyo (JP); Takuya Tsukamoto, Tokyo (JP); Takumi Yamane, Tokyo (JP); Yasushi Mizushima, Tokyo (JP); Kimiya Iwasaki, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/808,804

(22) Filed: Aug. 19, 2024

(51) Int. Cl.
  *H01J 61/28*  (2006.01)
  *H01J 61/26*  (2006.01)

(52) U.S. Cl.
  CPC .............. *H01J 61/28* (2013.01); *H01J 61/26* (2013.01)

(58) Field of Classification Search
  CPC ........................................ H01J 61/28
  USPC ........................................ 313/546
  See application file for complete search history.

(56) References Cited

U.S. PATENT DOCUMENTS

| | | | | |
|---|---|---|---|---|
| 8,882,889 B2* | 11/2014 | Baum | ................. | G01V 9/007 96/108 |
| 2006/0107831 A1* | 5/2006 | Karwacki, Jr. | ........ | B01D 53/04 95/116 |
| 2012/0167765 A1 | 7/2012 | Yuasa | | |
| 2012/0167770 A1 | 7/2012 | Yuasa | | |

FOREIGN PATENT DOCUMENTS

| | | |
|---|---|---|
| JP | 4305152 B2 | 7/2009 |
| JP | 2011-088773 A | 5/2011 |

* cited by examiner

*Primary Examiner* — Christopher M Raabe
(74) *Attorney, Agent, or Firm* — Studebaker Brackett PLLC

(57) ABSTRACT

Provided are a light-emitting gas recovery method and a recovery apparatus that allow light-emitting gas to be recover efficiently. A light-emitting gas recovery method includes: a step (a) of preparing a lamp to be discarded including a tube body filled with the light-emitting gas; a step (b) of placing the lamp in an internal space of a chamber; a step (c) of reducing an air pressure in the internal space of the chamber; a step (d) of applying energy to a part of the tube body to allow an internal space of the tube body and the internal space of the chamber to communicate with each other without entirely breaking the tube body, and releasing the light-emitting gas from the tube body; and a step (e) of discharging a first gas present in the internal space of the chamber toward a recovery mechanism after the step (d).

16 Claims, 8 Drawing Sheets

Fig.10

LIGHT-EMITTING GAS RECOVERY METHOD AND LIGHT-EMITTING GAS RECOVERY APPARATUS

CROSS-REFERENCE TO RELATED APPLICATIONS

This application claims priority of Japan Patent Application No. 2023-142200, which was filed on Sep. 1, 2023, and which is incorporated herein in its entirety by reference.

BACKGROUND OF THE INVENTION

Field of the Invention

The present invention relates to a method for recovering a light-emitting gas filled in a tube body of a lamp to be discarded, and a recovery apparatus.

Description of the Related Art

In recent years, noble gas (also referred to as "rare gas") such as xenon is used in a wide range of applications such as a light-emitting gas filled in a lamp, a gas for laser oscillation, and a gas for X-ray detection.

On the other hand, noble gas is only slightly contained in the air, and thus is typically produced as a by-product of a large-scale plant that produces oxygen and nitrogen in large quantities for industrial use. However, the number of such large-scale plants is limited. In addition, it takes a lot of energy to purify noble gas with high purity. Therefore, in combination with demands from a wide range of industries, noble gas is very rare and expensive.

In view of the above, a method for recovering and reusing used noble gas has been studied. For example, Patent Document 1 below describes a method for recovering xenon used in an X-ray detection device by connecting a gas adsorbent that adsorbs xenon to the device.

PRIOR ART DOCUMENTS

Patent Documents

Patent Document 1: JP-A-2011-88773
Patent Document 2: JP-B2-4305152

SUMMARY OF THE INVENTION

Meanwhile, the present applicant has manufactured a lamp containing xenon that is filled therein as a light-emitting gas (see Patent Document 2 above). For example, a xenon lamp is used for a projector or the like because of its excellent color rendering properties. The illuminance of the xenon lamp decreases as an electrode is deformed with an increase in lighting time. As a result, the xenon lamp reaches its end of life and is discarded. Meanwhile, xenon filled in the xenon lamp remains in a tube body.

Considering that a large amount of energy is consumed for producing and purifying xenon as described above, it is preferable to recover xenon remaining in, for example, a lamp that has reached its end of life and is to be discarded, and to reuse the recovered xenon for the production of a new lamp or the like. This point is not limited to xenon, and is applied to various kinds of noble gas used as a light-emitting gas.

In view of the above, an object of the present invention is to provide a method for efficiently recovering a light-emitting gas from a lamp to be discarded. Another object of the present invention is to provide a recovery apparatus suitable for executing the above method.

A light-emitting gas recovery method according to the present invention includes: a step (a) of preparing a lamp to be discarded including a tube body filled with a light-emitting gas; a step (b) of placing the lamp to be discarded in an internal space of a chamber; a step (c) of reducing an air pressure in the internal space of the chamber; a step (d) of applying energy to a part of the tube body to allow an internal space of the tube body and the internal space of the chamber to communicate with each other without entirely breaking the tube body, and releasing the light-emitting gas from the internal space of the tube body toward the internal space of the chamber; and a step (e) of discharging a first gas present in the internal space of the chamber toward a recovery mechanism disposed outside the chamber after the step (d).

In the present specification, the "lamp to be discarded" means all lamps determined to be discarded for some reason. That is, the present invention does not limit the reason why the lamp is to be discarded. The above method may be applied to, for example, a lamp whose illuminance reaches or falls below a certain value after being turned on, or may be applied to a lamp to be discarded due to manufacturing failure.

In addition, the concept of "energy" includes not only physical energy such as physical impact but also thermal energy supplied by laser irradiation and chemical energy supplied by contact of a chemical that chemically reacts with the tube body.

In the above method, the air pressure in the internal space of the chamber is reduced before the internal space of the chamber in which the lamp to be discarded is placed communicates with the internal space of the tube body. This is to increase the proportion of the light-emitting gas in the first gas by reducing air in the chamber. In addition, by allowing the internal space of the chamber and the internal space of the tube body to communicate with each other in a state where the difference between the internal pressure of the chamber and the filling pressure of the light-emitting gas filled in the tube body is increased, the release of the light-emitting gas from the tube body is accelerated, which is preferable. That is, the internal space of the chamber is depressurized in order to release the light-emitting gas from the inside of the tube body, and it is important to depressurize the internal space of the chamber as quickly as possible in order to efficiently recover the light-emitting gas. This is because it is necessary to release the light-emitting gas from many lamps in order to obtain a large amount of light-emitting gas. For example, after the light-emitting gas is released from one lamp, an operation of replacing the lamp with another lamp to release the light-emitting gas is repeated.

Here, if the entire tube body is broken in order to release the light-emitting gas from the inside of the tube body, fine fragments of the tube body, foreign substances derived from a member for sealing the tube body, and the like are likely to remain in the chamber. When there are foreign substances in the chamber, it takes a long time to reduce the pressure. In addition, a time required for cleaning to remove foreign substances from the inside of the chamber also increases. On the other hand, according to the above method, energy is applied to a part of the tube body to allow the internal space of the tube body and the internal space of the chamber to communicate with each other without breaking the entire tube body. Therefore, generation of foreign substances such as the fragments is suppressed, and thus it is less likely that foreign substances remain in the chamber. As a result, the time required for reducing the pressure inside the chamber and the time required for cleaning the inside of the chamber for the replacement of the lamp are reduced, so that the light-emitting gas can be efficiently recovered.

In addition, the tube body of the lamp includes an electrode for forming a discharge for turning on the lamp and an electrode rod for supporting the electrode. According to the above method, the entire tube body is not broken, and thus, it is easy to collect the electrode and the like after the light-emitting gas is released and the lamp is taken out from the chamber. That is, the above method also has an effect of easily taking out the electrode or the like from the tube body.

It takes a certain time to perform the step of placing the lamp in the chamber, the step of reducing pressure, and the step of releasing the emission gas in the lamp. For this reason, a method for gathering many lamps in a chamber and simultaneously breaking these lamps to release a large amount of light-emitting gas is also conceivable as a method for efficiently recovering the light-emitting gas. In this case, it is assumed that, in order to easily break many lamps that have been gathered, the tube bodies of the gathered lamps are entirely broken, but this method has difficulty in recovering, for example, the electrode and the electrode rod. Even if the electrode or the like could be recovered, it would be difficult to reuse the electrode or the like because of severe damage. From the viewpoint of reusing resources such as electrodes as well as the light-emitting gas, it is preferable to release the light-emitting gas from the tube body without entirely breaking the tube body.

The lamp to be discarded may include a discharge tube remaining part protruding outward from an outer wall of the tube body, and the step (d) may be a step of applying energy to the discharge tube remaining part to allow the internal space of the tube body and the internal space of the chamber to communicate with each other.

The tube body of the lamp typically has a discharge tube remaining part. More specifically, during manufacture of the lamp, a discharge tube for discharging unnecessary gas in the tube body and then filling the tube body with a light-emitting gas is formed at a part of the outer wall of the tube body. The discharge tube remaining part is a trace after the discharge tube is removed, and the discharge tube remaining part has a shape protruding outward from the outer wall of the tube body.

The light-emitting gas is filled in the tube body at a predetermined pressure. Therefore, if energy is applied to the outer wall of the tube body in order to release the light-emitting gas, a portion of the tube body that is broken in the entire tube body tends to increase. On the other hand, when energy is applied to the discharge tube remaining part to break the discharge tube remaining part, the outer wall of the tube body is less likely to be broken, because the discharge tube remaining part protruding from the outer wall of the tube body has lower mechanical strength than the tube body. That is, the above method can allow the inside of the tube body and the inside of the chamber to communicate with each other while suppressing the outer wall of the tube body from being mostly broken, whereby foreign substances are less likely to remain in the chamber, and the light-emitting gas can be recovered more efficiently.

The lamp to be discarded may include a pair of electrodes arranged to be separated from each other in the tube body, the step (b) may be a step of fixing the lamp to be discarded in the internal space of the chamber in a state where a direction in which the pair of electrodes is separated from each other is aligned with a substantially horizontal direction, and the discharge tube remaining part protrudes from the tube body when the tube body is viewed from vertically above, and the step (d) may be a step of applying physical energy to the discharge tube remaining part by an impact applier moving substantially downward in a vertical direction and colliding with the discharge tube remaining part.

It is preferable to fix the tube body in the chamber from the viewpoint of applying energy to the discharge tube remaining part protruding from the outer wall of the tube body. A specific embodiment will be described later in the section of "DETAILED DESCRIPTION OF THE PREFERRED EMBODIMENTS".

The light-emitting gas recovery method may include a step (f) of purifying the first gas recovered by the recovery mechanism to increase a proportion of a noble gas component of the light-emitting gas contained in the first gas.

Even when the inside of the chamber is depressurized, a certain amount of air is present in the chamber. Therefore, when the light-emitting gas is released from the inside of the tube body, a mixture of the light-emitting gas and the air (corresponding to the "first gas") is obtained. Here, from the viewpoint of increasing the proportion of noble gas in the first gas, it is preferable to reduce the pressure in the chamber as much as possible before the light-emitting gas is released. However, as described above, if it takes time to reduce the pressure, the time required for releasing the light-emitting gas from each lamp increases, and as a result, the efficiency of recovering the light-emitting gas decreases as a whole.

On the other hand, the above method includes a step of purifying the recovered first gas to increase the proportion of the noble gas component in the first gas. As a result, it is possible to shorten the time required for reducing the pressure in the chamber as a stage before the light-emitting gas is released. Consequently, the time required for releasing the light-emitting gas from the individual lamps is shortened, whereby the light-emitting gas is recovered more efficiently.

The step (f) may include: a step (f1) of reducing a proportion of an air-derived component contained in the first gas; a step (f2) of measuring a concentration of oxygen contained in the first gas after the step (f1) is executed; and a step (f3) of reducing a proportion of an impurity gas component different from the noble gas component in the light-emitting gas contained in the first gas that has undergone the step (f1) when a measurement result in the step (f2) is equal to or less than a predetermined threshold, and the method may return to the step (f1) when the measurement result in the step (f2) exceeds the threshold.

As described above, the first gas includes air present in the chamber and the light-emitting gas. The light-emitting gas contains a noble gas and a gas different from the noble gas. That is, the first gas contains a noble gas component of the light-emitting gas, an impurity gas derived from air present in the chamber, and an impurity gas derived from the light-emitting gas.

The time for executing the pressure reduction step is decreased as much as possible, and thus, the proportion of the air-derived impurity gas in the first gas is typically larger than the proportion of the impurity gas derived from the light-emitting gas in the first gas. The efficiency of the first gas purification step decreases when the difference between the former gas proportion and the latter gas proportion is large. For example, a getter that adsorbs both the air-derived component and the component derived from the light-emitting gas preferentially reacts with the air-derived component based on the reaction kinetics when the getter contacts with the first gas. That is, it is assumed that, even if the proportion of the air-derived impurity gas in the first gas can be reduced, the proportion of the impurity gas derived from the light-emitting gas in the first gas is hardly reduced.

In view of this, it is preferable to first execute the step of reducing the proportion of the air-derived impurity gas component in the first gas (hereinafter, referred to as a "first purification step" for convenience), and then execute the step of reducing the proportion of the impurity gas component derived from the light-emitting gas in the first gas (hereinafter, referred to as a "second purification step" for convenience).

In addition, since the proportion of the impurity gas component derived from the light-emitting gas in the first gas is relatively low, a getter having higher reactivity is used to remove the impurity gas component from the first gas. An example of the impurity gas component derived from the emission gas is carbon dioxide, and a getter having high reactivity with carbon dioxide tends to also exhibit reactivity with oxygen. In addition, many of such getters having high reactivity with a specific component utilize an irreversible adsorption reaction, and are typically unable to restore the adsorption capability by heating, for example. On the other hand, the above method includes executing the second purification step after confirming that the oxygen concentration of the first gas is equal to or less than the threshold, whereby the deterioration of the getter due to oxygen in the second purification step can be suppressed. Thus, the above method is preferable. Examples of other impurity gas components will be described in the section of "DETAILED DESCRIPTION OF THE PREFERRED EMBODIMENTS".

The step (f2) may be a step of measuring concentrations of target substances each containing oxygen and at least any one kind belonging to the group consisting of nitrogen, water, and hydrogen, the step (f3) may be executed when a measurement result in the step (f2) is equal to or less than a threshold set for each of the target substances, and the method may return to the execution of the step (f1) when the measurement result in the step (f2) exceeds the threshold set for each of the target substances.

From the viewpoint of suppressing the deterioration of the getter in the second purification step due to the reaction with the air-derived component, the concentration of, for example, nitrogen, water, or hydrogen may be measured in addition to the oxygen described above. In the above method, the second purification step is executed after it is confirmed that the concentration of the above-mentioned component as well as the oxygen concentration are equal to or less than the threshold, whereby the deterioration of the getter in the second purification step is further suppressed.

The lamp to be discarded may be a xenon lamp, the first gas discharged in the step (e) may include an impurity gas of at least one kind selected from the group consisting of oxygen, nitrogen, hydrogen, and water in a concentration of more than 2 ppm, and the step (f) may be a step of setting the concentration of the impurity gas contained in the first gas to 2 ppm or less. The specific example thereof will be described later.

The lamp to be discarded may be a halogen lamp, the first gas discharged in the step (e) may include an impurity gas of at least one kind selected from the group consisting of oxygen, nitrogen, hydrogen, and water in a concentration of more than 10 ppm, and the step (f) may be a step of setting the concentration of the impurity gas contained in the first gas to 10 ppm or less.

The lamp to be discarded may be a high-pressure mercury lamp, an excimer lamp, a flash lamp, or a metal halide lamp, the first gas discharged in the step (e) may include an impurity gas of at least one kind selected from the group consisting of oxygen, nitrogen, hydrogen, and water in a concentration of more than 5 ppm, and the step (f) may be a step of setting the concentration of the impurity gas contained in the first gas to 5 ppm or less.

The recovery mechanism may include: a first storage device that cools the first gas discharged from one or more chambers including the chamber, and holds the first gas in a solid state; and a second storage device supplied with the first gas vaporized from the first storage device, the step (e) may include a step (e1) of introducing the first gas from the chamber to the first storage device, and a step (e2) of introducing the first gas obtained by vaporizing the first gas in a solid state held in the first storage device into the second storage device, and the step (f) may be a step of purifying the first gas held in the second storage device.

The first gas may be stored in a compressed state in a high-pressure cylinder before being purified. By compressing the first gas to, for example, several tens of atmospheres, the first gas can be stored with the volume thereof being reduced. It is also possible to purify the first gas at a place different from the place where the first gas is recovered by the recovery mechanism by moving the high-pressure cylinder.

In the above method, the first gas is cooled and held in a solid state in the first storage device before being supplied to the second storage device such as a high-pressure cylinder. The pressure of the first gas can be easily increased by supplying the first gas vaporized from the solid state to the second storage device. Furthermore, an effect of increasing the proportion of the noble gas component of the light-emitting gas in the first gas due to a difference in freezing point can also be expected.

The recovery mechanism may include a plurality of the first storage devices, the second storage device may be supplied with the first gas vaporized from each of the plurality of first storage devices and collectively hold the first gas, the step (e1) may be executed for each of the one or more chambers, and the step (e2) may be a step of introducing the first gas from the plurality of first storage devices to the second storage device at different timings.

Further, at a timing when the step (e1) is executed in one chamber of the one or more chambers, the step (c) may be executed in another chamber of the one or more chambers.

With the above method, while one chamber discharges the first gas containing the light-emitting gas, the pressure reduction step is executed in another chamber, so that the light-emitting gas can be released from the tube body in the latter chamber earlier after the discharge of the first gas from the former chamber is completed. Thus, the light-emitting gas can be more efficiently recovered from a plurality of lamps.

Since the light-emitting gas is efficiently recovered from the lamp to be discarded, reuse of the light-emitting gas is promoted. This corresponds to the goal 12 "ensure sustainable consumption and production patterns" of the sustainable development goals (SDGs) led by the United Nations, and greatly contributes to the target 12.2 "by 2030, achieve the sustainable management and efficient use of natural resources".

An emission gas recovery apparatus according to the present invention includes: a chamber; a lamp placement unit on which a lamp to be discarded is placeable in an internal space of the chamber, the lamp including a tube body filled with a light-emitting gas; an impact applier capable of applying physical energy to a part of the tube body of the lamp to be discarded when the lamp to be discarded is placed on the lamp placement unit; a depressure unit that reduces an air pressure of an internal space of the chamber; and a discharge port for discharging a first gas present in the internal space of the chamber, the discharge port being provided at a part of the chamber.

It is possible to reduce a time required for reducing the pressure in the chamber and a time required for cleaning the inside of the chamber by applying energy to a part of the tube body of the lamp to be discarded and extracting the light-emitting gas without breaking the entire tube body as described above. That is, according to the above configuration, the light-emitting gas can be efficiently recovered from the tube body of the lamp to be discarded.

When the lamp to be discarded includes a discharge tube remaining part protruding outward from an outer wall of the tube body, the impact applier may be capable of applying physical energy to the discharge tube remaining part of the lamp to be discarded when the lamp to be discarded is placed on the lamp placement unit.

When the lamp to be discarded includes a pair of electrodes arranged to be separated from each other in the tube body, the lamp placement unit may include a fixing mechanism capable of fixing the lamp to be discarded in a state where a direction in which the pair of electrodes is separated from each other is aligned with a substantially horizontal direction and the discharge tube remaining part protrudes from the tube body as the tube body is viewed from vertically above.

With the above configuration, physical energy can be easily applied to the discharge tube remaining part by moving the impact applier in the vertical direction in the chamber.

Furthermore, from the viewpoint of shortening a time required to reduce the pressure in the internal space in the chamber and increasing the proportion of the light-emitting gas in the first gas, the ratio of the volume of the chamber to the volume of the tube body of the lamp to be discarded may be 100 or less.

The present invention can provide a light-emitting gas recovery method with which it is possible to efficiently recover a light-emitting gas from a lamp to be discarded, and a recovery apparatus suitable for executing the above method.

DETAILED DESCRIPTION OF THE PREFERRED EMBODIMENTS

Embodiments of a light-emitting gas recovery method and a recovery apparatus according to the present invention will be described below with reference to the drawings. Note that each of the drawings described below is schematically illustrated, and dimensional ratios or the numbers of components in the drawings do not necessarily coincide with the actual dimensional ratios or the actual number of components.

First Embodiment

Figure 1:
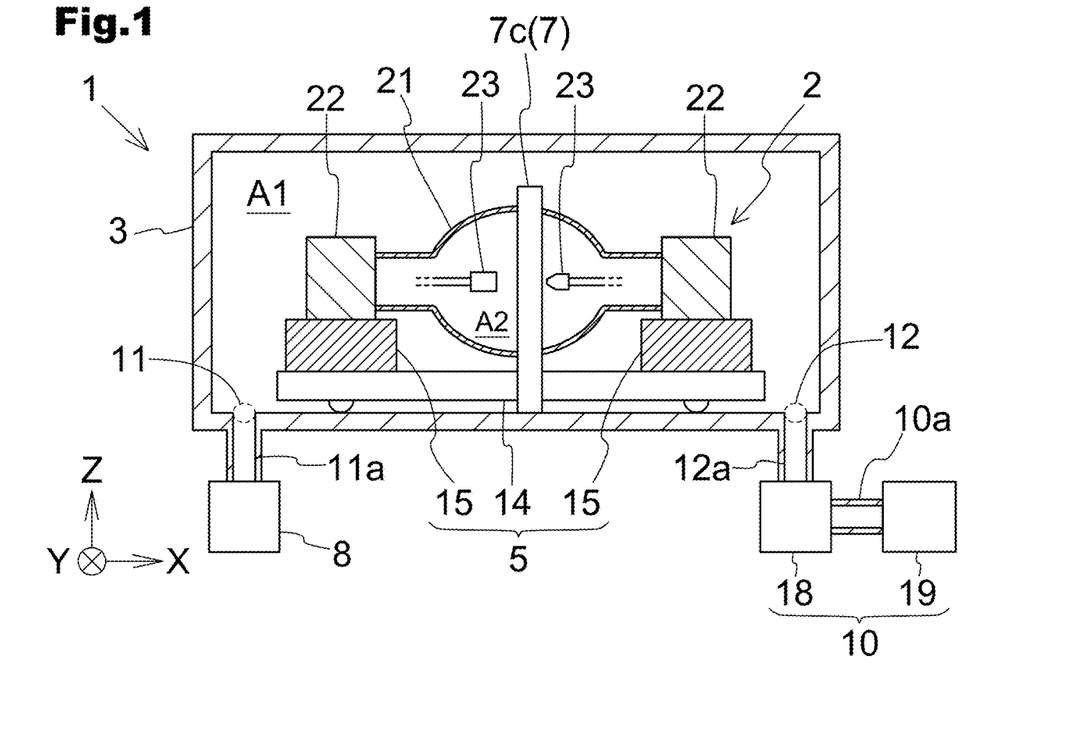
FIG. 1 is a diagram illustrating a configuration example of a light-emitting gas recovery apparatus.
Figure 2:
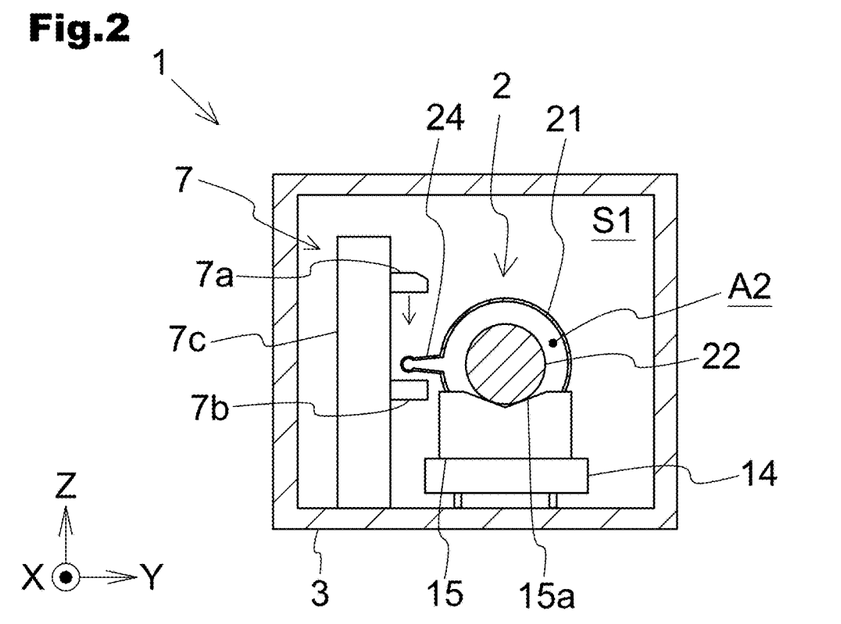
FIG. 2 is a diagram of the recovery apparatus in FIG. 1 as viewed in an X direction.

FIGS. 1 and 2 are diagrams illustrating a configuration example of a light-emitting gas recovery apparatus (hereinafter, simply referred to as a "recovery apparatus"). In the drawings described below, an X-Y-Z coordinate system including an X direction, a Y direction, and a Z direction orthogonal to each other is appropriately referred to. Typically, the Z direction is a vertical direction, and the X direction and the Y direction are horizontal directions. Based on this definition, FIG. 1 corresponds to a drawing of a recovery apparatus 1 as viewed in the Y direction, and FIG. 2 corresponds to a drawing of the recovery apparatus 1 in FIG. 1 as viewed in the X direction.

The configuration of the recovery apparatus 1 will be described with reference to FIGS. 1 and 2, and then, a light-emitting gas recovery method executed by the recovery apparatus 1 will be described.

As illustrated in FIG. 1, the recovery apparatus 1 includes a chamber 3, a lamp placement unit 5 on which a lamp 2 to be discarded (hereinafter, simply referred to as "lamp 2") is placed, an impact applier 7 that applies physical energy to the lamp 2, a depressure unit 8 that reduces the pressure in an internal space A1, and a recovery mechanism 10 that recovers a gas present in the internal space A1. FIGS. 1 and 2 illustrate a state in which the lamp 2 is placed in the internal space A1. In FIG. 2, the depressure unit 8 and the recovery mechanism 10 are not illustrated.

The chamber 3 includes a flow port 11 and a flow port 12 through which the gas present in the internal space A1 can flow at a part of the wall surface as illustrated in FIG. 1. The flow port 11 is connected to the depressure unit 8 through a pipe 11a, and the flow port 12 is connected to the recovery mechanism 10 through a pipe 12a. For convenience of illustration, the flow ports (11,12) are located on the side surface of the chamber 3 in the Z direction in FIG. 1, but the flow ports (11, 12) can be provided at any position. The flow port 12 corresponds to a "discharge port". As an example, the volume of the chamber 3 is 5 L.

The lamp placement unit 5 includes a stage 14 and a plurality of blocks 15 disposed on the stage 14 as illustrated in FIG. 1. Each of the blocks 15 has, for example, a placement surface 15a having a V shape when viewed in the X direction (see FIG. 2).

The impact applier 7 includes, as an example, a hammer 7a, a stopper 7b, and a columnar support 7c as illustrated in FIG. 2. The columnar support 7c supports the hammer 7a and the stopper 7b, and the hammer 7a is movable in the Z direction.

The depressure unit 8 includes, as an example, a pump that sucks the gas in the internal space A1. The recovery mechanism 10 includes a tank 18 connected to the flow port 12 and a high-pressure cylinder 19 connected to the tank 18 via a pipe 10a. Specific configuration examples of the tank 18 and the high-pressure cylinder 19 will be described later.

As an example, the lamp 2 is a xenon lamp. As illustrated in FIGS. 1 and 2, the lamp 2 includes a tube body 21, a pair of bases 22 attached to both ends of the tube body 21, a pair of electrodes 23 arranged to be separated from each other in an internal space A2 of the tube body 21, and a discharge tube remaining part 24 protruding outward from an outer wall of the tube body 21. A light-emitting gas (not illustrated in FIGS. 1 and 2, see FIG. 4 to be described later) containing xenon is filled in the internal space A2. In FIG. 1, the tube body 21 is transparent for convenience of illustration. As an example, the filling pressure of the light-emitting gas of the lamp 2 is about 1500 kPa, and the volume of the tube body 21 is 300 mL.

Next, a light-emitting gas recovery method (hereinafter, simply referred to as a "recovery method") that can be executed by the recovery apparatus 1 will be described.

Figure 3:
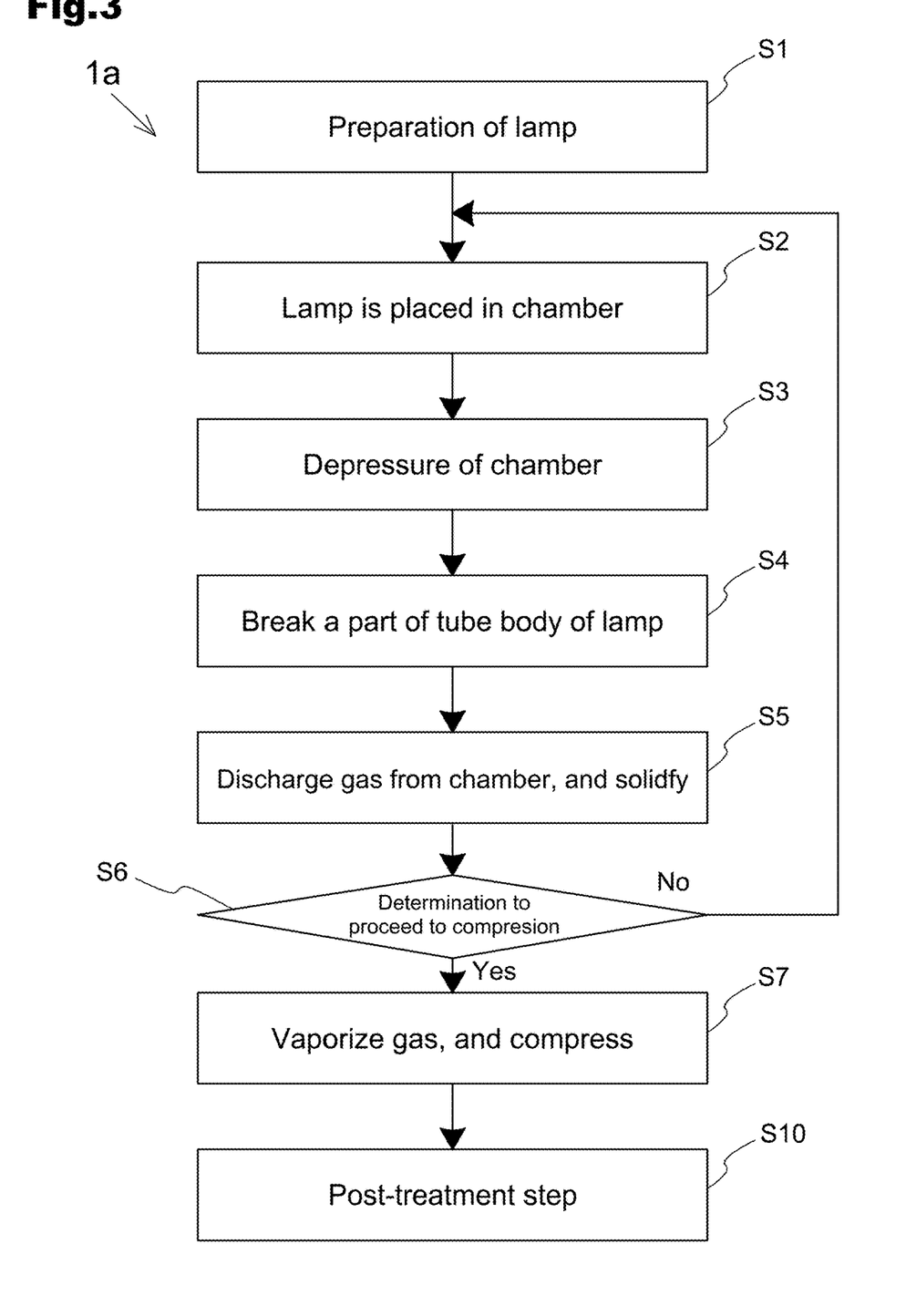
FIG. 3 is a flowchart illustrating an example of a recovery method according to the present invention.

FIG. 3 is a flowchart illustrating an example of the recovery method according to the present invention. A recovery method 1a includes step S1 of preparing the lamp 2, step S2 of placing the lamp 2 in the internal space A1 of the chamber 3, step S3 of reducing the air pressure in the internal space A1, step S4 of applying energy to the tube body 21 of the lamp 2 to break a part of the tube body 21 and to release the light-emitting gas from the tube body 21, step S5 of discharging the gas present in the internal space A1 and converting the gas into a solid after step S4, step S6 of determining whether to proceed to subsequent step S7 after the execution of step S5, step S7 of vaporizing and compressing the gas in a solid state obtained in step S5, and post-treatment step S10.

(Preparation Step S1)

The lamp 2 to be discarded is prepared. As an example, the lamp 2 is a xenon lamp having the structure described with reference to FIG. 1. As described above, the present invention does not limit the reason why the lamp 2 is to be discarded. The preparation step S1 corresponds to step (a).

(Placement Step S2)

Figure 4:
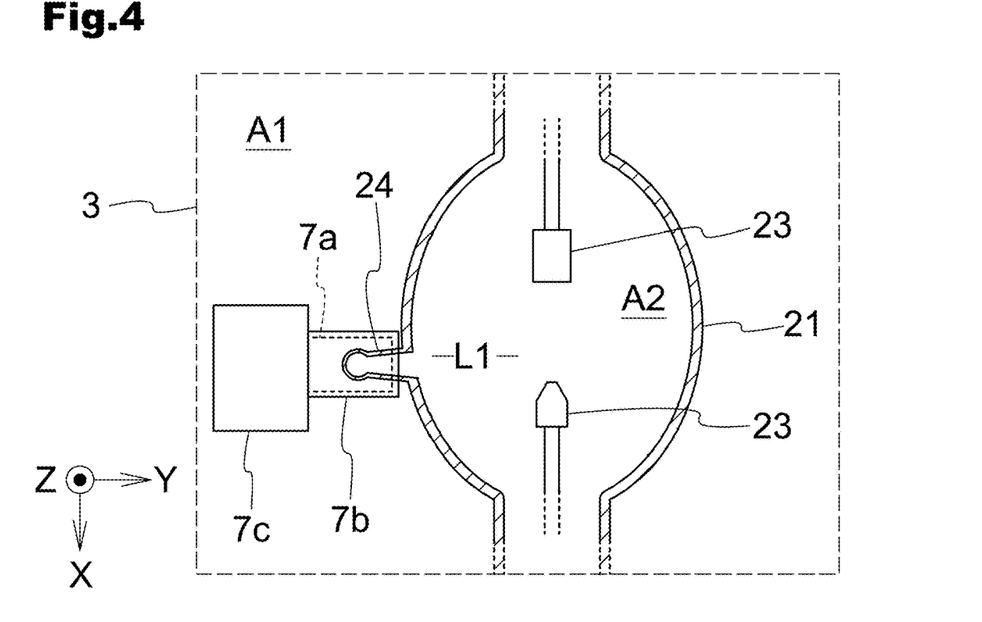
FIG. 4 is a partially enlarged view of a lamp placed on a lamp placement unit as viewed in a Z direction.

Next, the lamp 2 is placed on the lamp placement unit 5. FIG. 4 is a partially enlarged view of the lamp 2 placed on the lamp placement unit 5 as viewed in the Z direction. As illustrated in FIG. 4, the lamp 2 is placed such that the separation direction of the pair of electrodes 23 coincides with the X direction. In addition, the lamp 2 is placed such that the discharge tube remaining part 24 protrudes from the tube body 21 when the tube body 21 is viewed in the Z direction. Further, as illustrated in FIG. 4, the discharge tube remaining part 24 is located between the hammer 7a and the stopper 7b of the impact applier 7 (see also FIGS. 1 and 2). Thus, energy is applied to the discharge tube remaining part 24 in the subsequent breaking step S4. In FIG. 4, the position of the hammer 7a is indicated by a broken line for convenience of illustration.

As described with reference to FIG. 2, the block 15 in contact with the base 22 has the placement surface 15a having a V shape when viewed in the X direction. Thus, the lamp 2 can be fixed on the stage 14. Note that the block 15 may be in contact with the tube body 21.

As an example, after the lamp 2 is placed on the lamp placement unit 5, the lamp placement unit 5 slides in the X direction and is carried into the internal space A1 of the chamber 3. In this case, an opening/closing portion (not illustrated) is provided on the side surface of the chamber 3 in the X direction. The lamp placement unit 5 may be installed in advance in the chamber 3, and the lamp 2 may be placed on the lamp placement unit 5 in the chamber 3 through an opening/closing portion (not illustrated) provided on a side surface of the chamber 3 in the Z direction.

When the chamber 3 is used before the lamp 2 is placed in the internal space A1, a lamp (hereinafter, referred to as "treated lamp") having a tube body from which a light-emitting gas has been released may be present in the internal space A1. In this case, the lamp 2 is placed in the internal space A1 after the treated lamp is taken out of the chamber 3, and a step (not illustrated) for cleaning the inside of the chamber 3 is executed.

The placement step S2 corresponds to step (b).

(Pressure Reduction Step S3)

After the lamp 2 is placed in the internal space A1, the air pressure in the internal space A1 is reduced by the depressure unit 8. As an example, the operating time of the depressure unit 8 is set to 10 minutes or less, and the air pressure in the internal space A1 after the pressure reduction is set to 0.1 Pa or more.

From the viewpoint of reducing the pressure in the internal space A1 as soon as possible and increasing the proportion of a light-emitting gas L1 in a first gas G1 to be described later, the ratio of the volume of the chamber 3 to the volume of the tube body 21 of the lamp 2 is preferably 100 or less, more preferably 50 or less, and most preferably 20 or less.

The pressure reduction step S3 corresponds to step (c).

(Breaking Step S4)

In the present embodiment, a part of the tube body 21 is broken by applying physical energy by the impact applier 7. Specifically, the hammer 7a in the state illustrated in FIGS. 2 and 4 is moved in the Z direction toward the stopper 7b. When the hammer 7a collides with the discharge tube remaining part 24, physical energy is applied to the discharge tube remaining part 24.

Any means can be used for driving the impact applier 7 in the chamber 3. For example, the movement of the hammer 7a may be started by a physical mechanism provided outside the chamber 3, or the impact applier 7 may receive an electric signal from the outside of the chamber 3 to move the hammer 7a.

Figure 5:
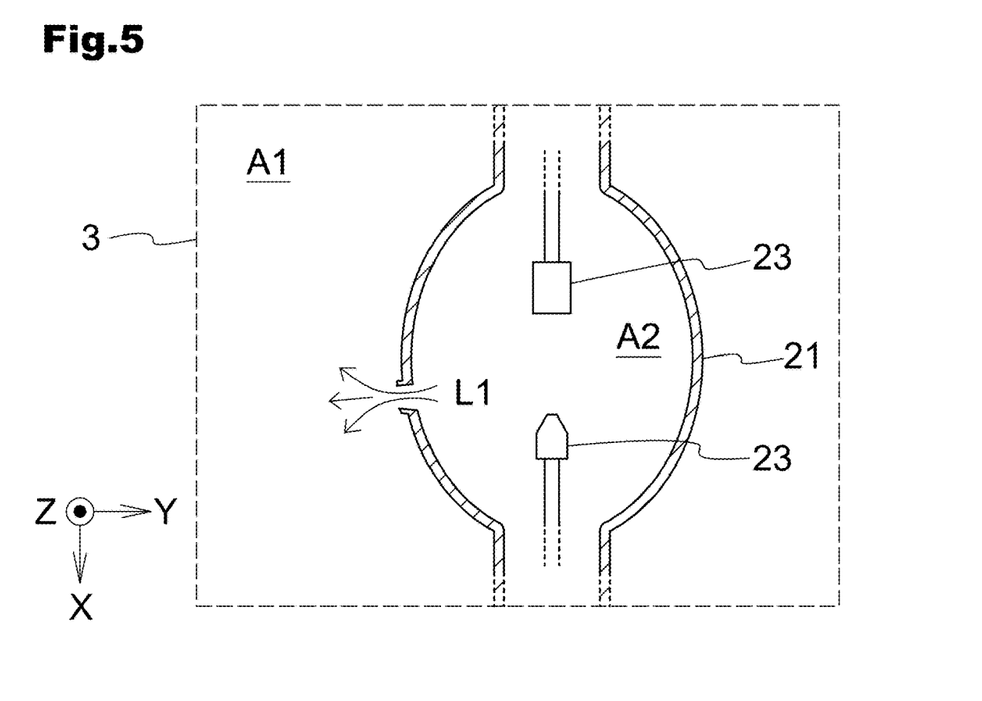
FIG. 5 is a diagram schematically illustrating an appearance of the lamp to which energy has been applied to a discharge tube remaining part.

FIG. 5 is a diagram schematically illustrating an appearance of the lamp 2 to which energy has been applied to the discharge tube remaining part 24. In FIG. 5, the impact applier 7 is not illustrated, and the tube body 21 is enlarged as in FIG. 4. As illustrated in FIG. 5, the application of energy to the discharge tube remaining part 24 can allow the internal space A2 of the tube body 21 and the internal space A1 of the chamber 3 to communicate with each other without breaking the entire tube body 21.

The air pressure in the internal space A1 is reduced in the previous pressure reduction step S3. That is, the air pressure in the internal space A2 is higher than the air pressure in the internal space A1, whereby the light-emitting gas L1 is released from the internal space A2 toward the internal space A1.

The present embodiment has described an example in which the hammer 7a moves in the Z direction, but the present invention does not limit the moving direction of the hammer 7a. For example, the hammer 7a may be movable in the Y direction. In this case, in the previous placement step S2, the discharge tube remaining part 24 may be disposed so as to protrude from the wall surface of the tube body 21 in the Z direction when the tube body 21 is viewed in the X direction, and the hammer 7a may apply physical energy to the discharge tube remaining part 24.

The breaking step S4 corresponds to step (d).

(Solidification Step S5)

Figure 6:
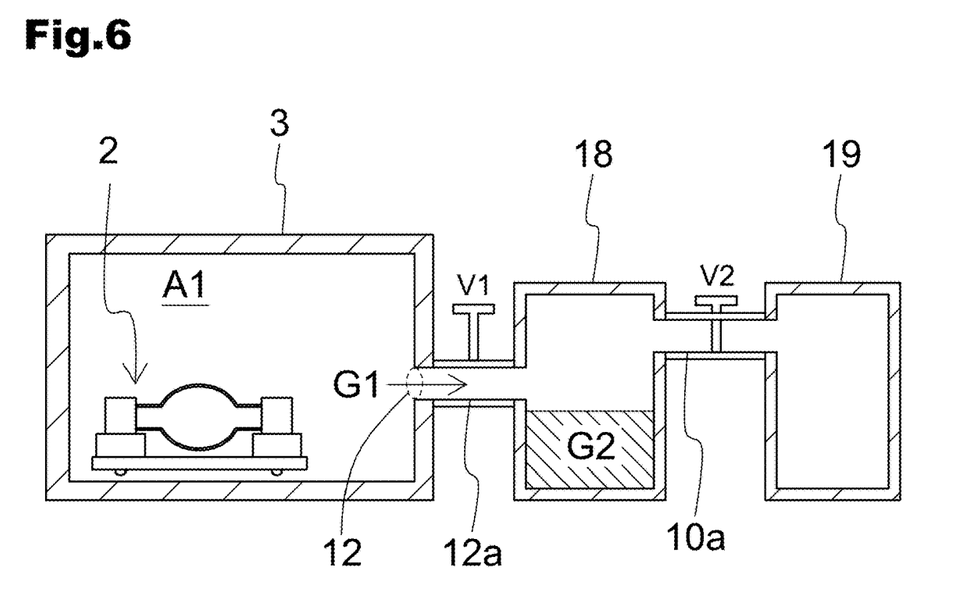
FIG. 6 is a diagram schematically illustrating the recovery apparatus at a state after a breaking step is executed.

As described with reference to FIG. 5, the light-emitting gas L1 is released from the tube body 21, a mixture of the light-emitting gas L1 and air present in the chamber 3 (corresponding to the "first gas G1") is obtained. FIG. 6 is a diagram schematically illustrating the recovery apparatus 1 at a state after the execution of the breaking step S4. In FIG. 6, the positions of the valves (V1, V2) mounted on the pipe 12a and the pipe 10a are different to schematically illustrate the open/close states of the pipes.

As illustrated in FIG. 6, the first gas G1 is converted into a solid in the tank 18, and is held in a solid state. At this time, the first gas G1 is introduced into the tank 18 by, for example, a suction unit (not illustrated) that sucks the gas in the chamber 3. In the following description, the first gas G1 in a solid state may be referred to as "first gas G2" in order to be distinguished from the first gas G1 before being converted into a solid. Specifically, the tank 18 includes a cooling unit (not illustrated) capable of cooling the first gas G1 with liquid nitrogen, and a heating unit (not illustrated) capable of heating the first gas G2 in a solid state. By cooling and solidifying the first gas G1, the first gas G1 can be held with the volume being reduced.

In addition, the proportion of xenon in the first gas G2 is increased by a difference in freezing point. More specifically, the freezing point of xenon is about −110° C., whereas the freezing point of oxygen is about −220° C. and the boiling point is about −180° C. It is considered that the first gas G1 is cooled to about −190° C. by the liquid nitrogen, and some oxygen is liquefied and remains in the first gas G2, but not all oxygen is converted into liquid. Therefore, the proportion of xenon in the first gas G2 is increased. Note that the first gas G1 that has passed through the cooling unit in a gaseous state has a low xenon proportion, and thus, may be discharged from an exhaust pipe (not illustrated). The above discussion can be similarly applied when the noble gas component in the light-emitting gas L1 is, for example, krypton. The tank 18 corresponds to the "first storage device", and the solidification step S5 corresponds to step (e1).

(Determination Step S6)

After the execution of the solidification step S5, it is appropriately determined whether to proceed to step S7 for compressing the first gas G2 held in a solid state into the high-pressure cylinder 19 (see FIG. 3). As an example, when an amount of the first gas G2 is not sufficient to fill the high-pressure cylinder 19 ("No" in the determination step S6), a lamp to be discarded different from the lamp 2 is placed in the internal space A1, and steps S2 to S5 are executed. On the other hand, when the amount of the first gas G2 is sufficient to fill the high-pressure cylinder 19 ("Yes" in the determination step S6), the subsequent compression step S7 is executed.

As described above, in the present embodiment, the light-emitting gas L1 is released from the tube body 21 without breaking the entire tube body 21. Therefore, it is possible to quickly perform an operation of taking out the lamp 2 (treated lamp) from which the light-emitting gas L1 has been released from the chamber 3 and an operation of cleaning the inside of the chamber 3 after the release of the first gas G1 from the chamber 3 is completed. That is, since the entire tube body 21 is not broken, the time required from when the internal space A1 of the chamber 3 is returned to the atmospheric pressure until the chamber 3 is brought into a state capable of receiving the next lamp to be discarded is shortened to, for example, several minutes or less. If the entire tube body 21 is broken, the time required for the operation of taking out the treated lamp or the like is significantly increased.

Note that the wording "the release of the first gas G1 from the chamber 3 is completed" may mean that the air pressure in the internal space A1 increased by the release of the light-emitting gas L1 from the internal space A2 has decreased to the same level as the air pressure when energy is applied to the discharge tube remaining part 24 by the suck of the suction unit.

(Compression Step S7)

Figure 7:
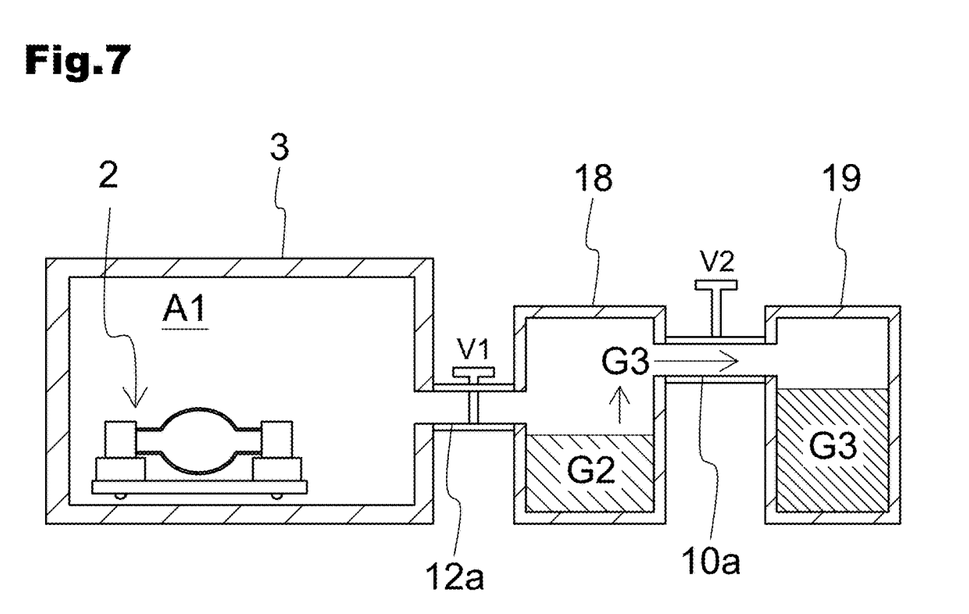
FIG. 7 is a diagram illustrating, in accordance with FIG. 6, the recovery apparatus at a state of vaporizing a first gas held in a solid state and introducing the resultant first gas into a high-pressure cylinder.

FIG. 7 is a diagram illustrating, in accordance with FIG. 6, the recovery apparatus 1 at a state of introducing a gas (hereinafter, referred to as a "first gas G3") obtained by vaporizing the first gas G2 held in a solid state into the high-pressure cylinder 19. The first gas G2 in a solid state is heated and vaporized by the heating unit (not illustrated), whereby the first gas G3 is obtained. Then, the first gas G3 is compressed into the high-pressure cylinder 19. In the high-pressure cylinder 19, the pressure of the first gas G3 is, for example, several tens of atmospheres. Here, in the present embodiment, the first gas G3 is obtained by vaporizing the first gas G2 in a solid state, and thus, it is easy to increase the pressure of the first gas G3. The high-pressure cylinder 19 corresponds to a "second storage device". The compression step S7 corresponds to step (e2).

The light-emitting gas L1 released from the tube body 21 can be recovered by recovering the first gas G1 into the recovery mechanism 10. The solidification step S5 and the compression step S7 correspond to step (e).

(Post-Treatment Step S10)

The high-pressure cylinder 19 holding the first gas G3 can be gathered and stored at any storage place.

Second Embodiment

Figure 8:
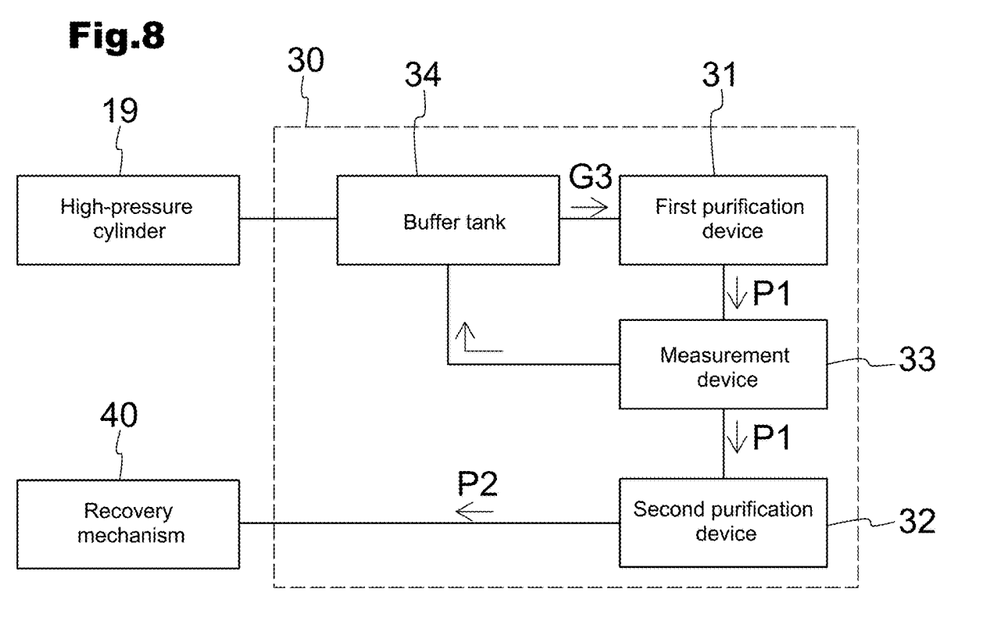
FIG. 8 is a block diagram schematically illustrating a configuration of a recovery apparatus according to a second embodiment.
Figure 9:
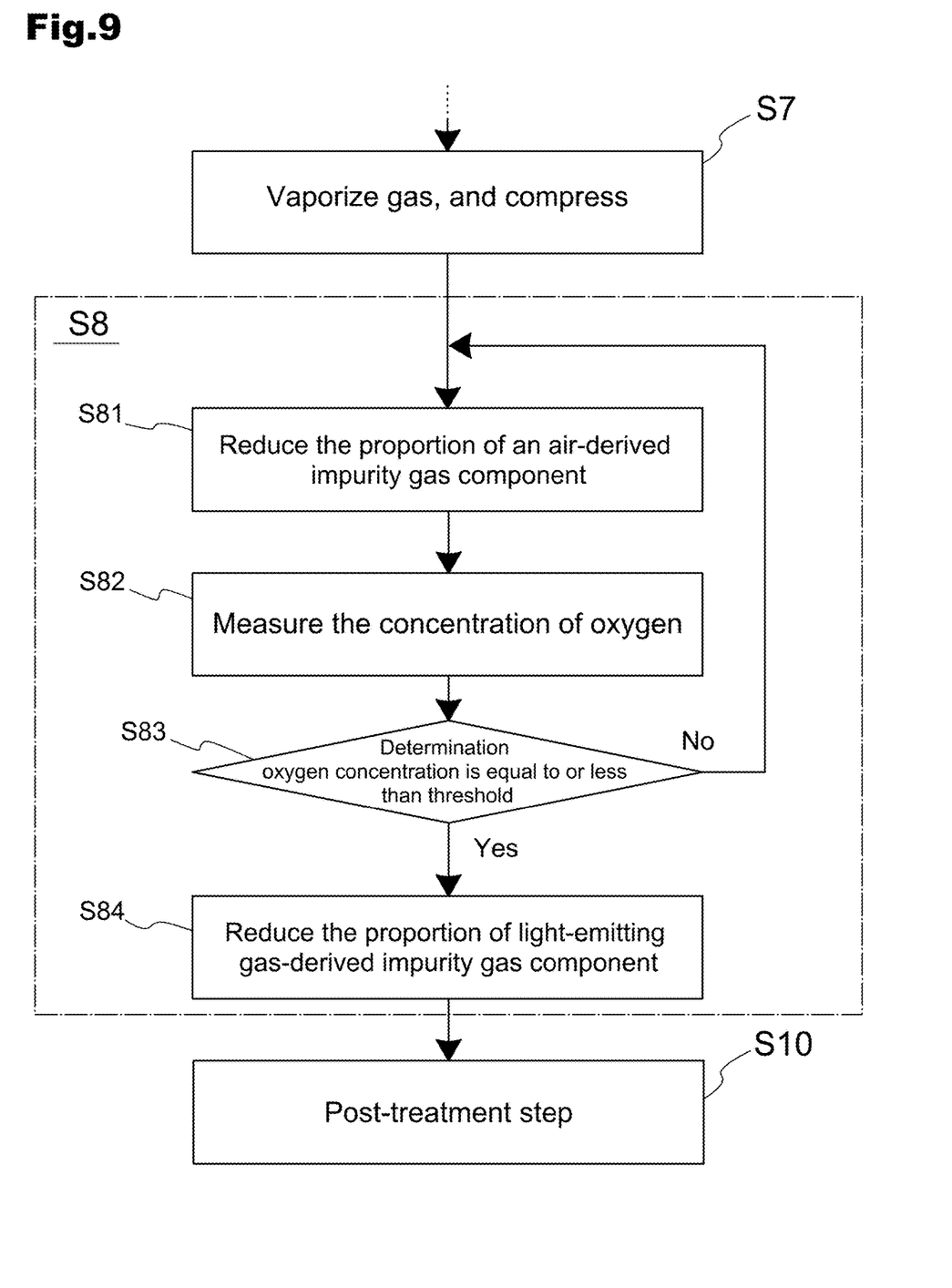
FIG. 9 is a flowchart illustrating an example of a recovery method executed by the recovery apparatus illustrated in FIG. 8.

A recovery apparatus according to a second embodiment of the present invention will be described mainly on differences from the first embodiment. FIG. 8 is a block diagram schematically illustrating a configuration of the recovery apparatus according to the second embodiment. FIG. 9 is a flowchart illustrating an example of a recovery method executed by the recovery apparatus 1 illustrated in FIG. 8. The present embodiment is different from the first embodiment in having a purification mechanism 30 for purifying the first gas G3 recovered into a high-pressure cylinder 19 and a recovery mechanism 40 for recovering the gas having passed through the purification mechanism 30, and executing a purification step S8 of purifying the first gas G3.

The proportion of xenon in the first gas G3 is increased by the purification step S8. The similar discussion as in the first embodiment can be applied to the processes from the preparation step S1 to the compression step S7. In view of this, FIG. 9 does not illustrate the steps preceding the compression step S7. Similarly, FIG. 8 does not illustrate the chamber 3 and the like. The purification step S8 will be described below along with the configuration of the purification mechanism 30.

(Purification Step S8)

As illustrated in FIG. 8, the purification mechanism 30 includes a buffer tank 34 connected to a high-pressure cylinder 19, a first purification device 31, a second purification device 32, and a measurement device 33. The buffer tank 34 is installed for the purpose of adjusting the flow rate of the gas in the purification mechanism 30.

The first purification device 31 executes step S81 (see FIG. 9) for purifying the first gas G3 supplied from the buffer tank 34 to reduce the proportion of an air-derived impurity gas component contained in the first gas G3. Specifically, in the first purification device 31, a getter that adsorbs oxygen is brought into contact with the first gas G3. As a result, the proportion of oxygen in the first gas G3 having passed through the first purification device 31 is reduced. The flow rate of the first gas G3 flowing through the first purification device 31 is, for example, 5 L/min.

Step S81 for purifying the first gas G3 in the first purification device 31 corresponds to step (f1). In the following description, the first gas G3 having passed through the first purification device 31 may be referred to as "first gas P1" in order to be distinguished from the first gas G3 that has not passed through the first purification device 31 (see FIG. 8).

The measurement device 33 includes an oxygen concentration meter and measures the concentration of oxygen contained in the first gas P1 (step S82). When the oxygen concentration is equal to or less than a predetermined threshold, the first gas P1 is supplied to the second purification device 32. On the other hand, when the oxygen concentration exceeds the predetermined threshold, the first gas P1 is sent to the buffer tank 34, and the first gas P1 is purified again by the first purification device 31 (step S83). That is, as illustrated in FIG. 9, step S81 is repeated until the oxygen concentration of the first gas P1 becomes equal to or less than the predetermined threshold. Step S82 for measuring the oxygen concentration of the first gas P1 by the measurement device 33 corresponds to step (f2).

The lamp 2 is a xenon lamp, and thus, an amount of air in the light-emitting gas L1 is very small. However, in view of the first gas G1 containing an air-derived impurity gas as described above, it is considered that, when the lamp 2 is a xenon lamp, the concentration of each of oxygen, nitrogen, and water in the first gas G1 exceeds 2 ppm. In response to this, the threshold regarding, for example, the oxygen concentration is preferably 1 ppm or less, more preferably 0.5 ppm or less, and particularly preferably 0.1 ppm or less.

In step S83, it is determined whether to proceed to step S84 on the basis of the measurement result by the measurement device 33 as illustrated in FIG. 9. As a more detailed example, the purification mechanism 30 includes a first pipe extending from the first purification device 31, a second pipe connected to the first pipe and reaching the second purification device 32, a third pipe branching from a connection point between the first pipe and the second pipe and reaching the buffer tank 34, a three-way valve that adjusts to allow or interrupt communication between the first pipe and the second pipe and between the first pipe and the third pipe, and a controller that adjusts an opening degree of the three-way valve. The controller adjusts the opening degree of the three-way valve on the basis of the measurement result by the measurement device 33. Under this configuration, when the oxygen concentration of the first gas P1 exceeds the predetermined threshold, the controller controls the three-way valve to allow communication between the first pipe and the third pipe, and to interrupt communication between the first pipe and the second pipe. When it is confirmed that the oxygen concentration of the first gas P1 has reached the predetermined threshold or less, the controller controls the three-way valve to interrupt communication between the first pipe and the third pipe and to allow communicate between the first pipe and the second pipe.

The second purification device 32 executes step S84 of purifying the first gas P1 supplied from the first purification device 31 to reduce the proportion of an impurity gas component that is derived from the light-emitting gas different from xenon and that is contained in the first gas P1 (see FIG. 9). In the following description, the first gas P1 having passed through the second purification device 32 may be referred to as "first gas P2" in order to be distinguished from the first gas P1 that has not passed through the second purification device 32 (see FIG. 8). Examples of the impurity gas derived from the light-emitting gas L1 in the xenon lamp include carbon dioxide. For example, in the second purification device 32, a getter that adsorbs carbon dioxide is brought into contact with the first gas P1. As a result, it is possible to obtain the first gas P2 in which the proportion of the impurity gas component derived from the light-emitting gas L1 is reduced.

In addition, examples of the impurity gas derived from the light-emitting gas L1 also include carbon monoxide, a fluorine compound, and hydrocarbon. Furthermore, in a case where the lamp 2 is a xenon lamp, a noble gas different from xenon, such as helium, argon, or krypton, is also an impurity gas derived from the light-emitting gas. In view of this, the second purification device 32 may have a getter that adsorbs carbon monoxide, a fluorine compound, hydrocarbon, or the like. Similarly, the second purification device 32 may have a getter that adsorbs a noble gas different from xenon, such as helium, argon, or krypton.

As described above, the proportion of the impurity gas derived from the light-emitting gas L1 in the first gas P1 is lower than that of the air-derived component. Therefore, in order to remove the impurity gas component derived from the light-emitting gas L1 from the first gas P1, a getter having high reactivity with the impurity gas component derived from the light-emitting gas is used. Here, it is typical that the getter exhibits reactivity to oxygen and cannot be reused by an irreversible adsorption reaction. However, in the present embodiment, step S84 is executed after it is confirmed that the oxygen concentration of the first gas P1 is equal to or less than the threshold (steps S82 and S83), and thus, it is possible to suppress deterioration of the getter that adsorbs the impurity gas derived from the light-emitting gas L1 due to oxygen. That is, the concentration of the impurity gas component derived from the light-emitting gas L1 can be preferably reduced by reducing the proportion of the air-derived impurity gas component in the first gas P1 by the first purification device 31 and then performing purification by the second purification device 32. Step S84 of purifying the first gas P1 in the second purification device 32 corresponds to step (f3).

In view of the type and filling amount of the getter included in the second purification device 32, the first purification device 31 may include, in addition to the getter that adsorbs oxygen, a getter that adsorbs at least one target substance belonging to the group consisting of nitrogen, water, and hydrogen. Further, the measurement device 33 may measure the concentration of the target substance in addition to the oxygen concentration. In this case, step S84 may be executed when the measurement result of step S82 is equal to or less than a threshold set for each target substance, and step S81 may be repeated when the measurement result of step S82 exceeds the threshold.

For example, the threshold regarding the water concentration is preferably 1 ppm or less, more preferably 0.5 ppm or less, and particularly preferably 0.1 ppm or less. Similarly, the threshold regarding the nitrogen concentration or the hydrogen concentration is preferably 1 ppm or less, more preferably 0.5 ppm or less, and particularly preferably 0.1 ppm or less.

To be sure, it is presumed that hydrogen contained in the first gas G1 includes hydrogen derived from air and hydrogen derived from the light-emitting gas. More particularly, it is believed that hydrogen is generated from water in the air. In addition, it is considered that, when the lamp 2 is heated to a high temperature by lighting, hydrogen is generated from tungsten constituting the electrode 23 or a glass material constituting the tube body 21, and hydrogen is contained in the light-emitting gas L1.

In order to measure the concentrations of the target substances, the measurement device 33 may include a dew point meter and any kind of nitrogen concentration meter and hydrogen concentration meter.

The present invention does not exclude a decrease in the proportion of components different from the air-derived component in the first purification device 31. For example, the first purification device 31 may include a getter that adsorbs carbon monoxide which is an impurity gas derived from the light-emitting gas L1. In the second purification device 32, the proportion of the air-derived component may be reduced. Specifically, it is preferable that a getter having higher reactivity than a getter that adsorbs oxygen in the first purification device 31 is disposed in the second purification device 32.

The air-derived impurity gas and the impurity gas derived from the light-emitting gas L1 have been mainly described above. However, it is also conceivable that the first gas G1 contains a component derived from an adhesive used for fixing the tube body 21 and the bases 22 of the lamp 2. When the adhesive is porous, it is also conceivable that the adhesive adsorbs components in the air while the lamp 2 is used. Therefore, the first purification device 31 and the second purification device 32 may include getters that adsorb a component derived from the adhesive.

In the above description, the lamp 2 is a xenon lamp, but the lamp 2 may be a halogen lamp, a high-pressure mercury lamp, an excimer lamp, a flash lamp, or a metal halide lamp.

When the lamp 2 is a high-pressure mercury lamp, an excimer lamp, a flash lamp, or a metal halide lamp, it is considered that the concentration of each of oxygen, nitrogen, and water in the first gas G1 exceeds 10 ppm due to a difference in manufacturing process from the xenon lamp, a difference in concentration of noble gas in the light-emitting gas, and the like. In response to this, the concentration of the air-derived component gas is preferably set to 10 ppm or less by the purification mechanism 30.

In addition, the halogen lamp typically has a lower concentration of noble gas in the light-emitting gas than the xenon lamp, but has a higher concentration of noble gas than the high-pressure mercury lamp or the like. In view of such circumstances, when the lamp 2 is a halogen lamp, it is considered that the concentration of each of oxygen, nitrogen, and water in the first gas G1 exceeds 5 ppm. In response to this, the concentration of the air-derived component gas is preferably set to 5 ppm or less by the purification mechanism 30.

The purification step S8 may be performed at a place different from the place where the compression step S7 is performed. More specifically, the purification step S8 may be executed after carrying the high-pressure cylinder 19 in which the first gas G3 is compressed into the place where the purification mechanism 30 is installed.

The purification step S8 corresponds to step (f).

(Post-Treatment Step S10)

The first gas P2 that has passed through the second purification device 32 is recovered and stored in any kind of recovery mechanism 40.

[Modifications]

Modifications of the recovery apparatus 1 will now be described.

Figure 10:
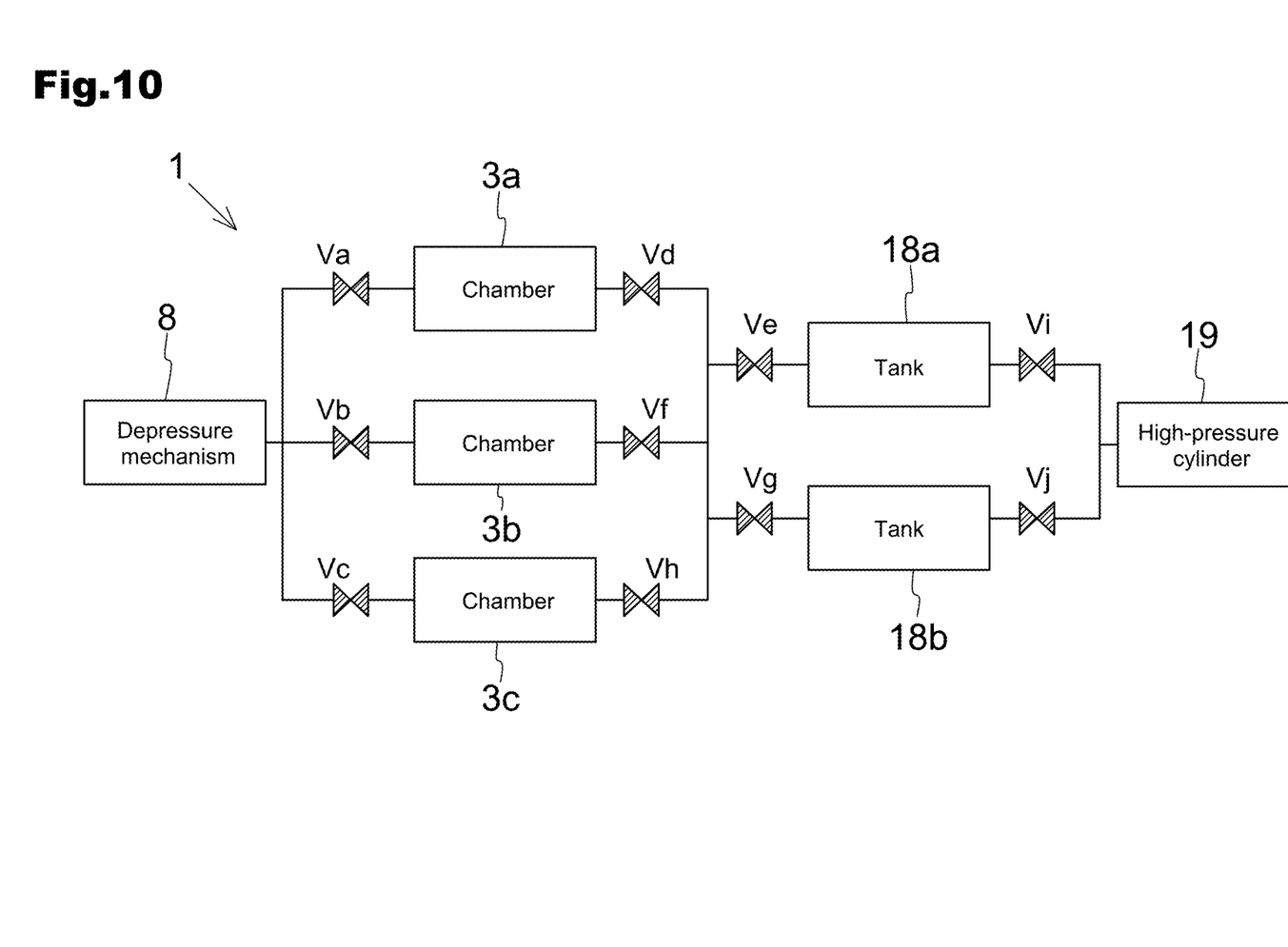
FIG. 10 is a block diagram schematically illustrating a configuration of a recovery apparatus according to a modification.

<1>FIG. 10 is a block diagram schematically illustrating a configuration of a recovery apparatus 1 according to a modification. The present modification is different from the first embodiment in that the recovery apparatus 1 includes a plurality of chambers (3a, 3b, 3c) and a plurality of tanks (18a, 18b).

As illustrated in FIG. 10, the recovery apparatus 1 according to the present modification includes three chambers (3a, 3b, 3c). The chambers (3a, 3b, 3c) are connected to the depressure unit 8 via valves Va to Vc, respectively. The chambers (3a, 3b, 3c) are also connected to the tanks (18a, 18b) via valves Vd to Vh. The tanks (18a, 18b) are connected to a high-pressure cylinder 19 via a valve Vi and a valve Vj, respectively.

For example, after the first gas G1 released from the chamber 3a is solidified in the tank 18a, the first gas G1 released from the chamber 3b is solidified in the tank 18a. That is, in the present modification, the solidification step S5 is executed for each chamber.

In the present modification, the lamp 2 can be placed in the chamber 3b and the pressure reduction step S3 can be executed at a timing at which the solidification step S5 is executed for the lamp 2 placed in the chamber 3a. More specifically, the valves (Vb, Vd, Ve) are opened and the valves (Va, Vc, Vf to Vh) are closed to perform the solidification step S5 in the chamber 3a, and at the same time, perform the pressure reduction step S3 in the chamber 3b. As a result, after the solidification step S5 in the chamber 3a is completed, the breaking step S4 can be quickly executed in the chamber 3b. That is, the light-emitting gas L1 can be efficiently recovered from the plurality of lamps 2.

After the first gas G1 released from each chamber (3a, 3b, 3c) is repeatedly solidified and the tank 18a is filled, the first gas G1 is introduced into the tank 18b by appropriately switching the open/close states of the valve Ve and the valve Vg.

According to the present modification, by appropriately adjusting the open/close state of each valve, it is possible to vaporize the first gas G2 in a solid state held in the tank 18a and introduce the first gas G3 into the high-pressure cylinder 19 while the first gas G1 is introduced from each chamber (3a, 3b, 3c) to the tank 18b. That is, in the present modification, the first gas G3 is introduced into the high-pressure cylinder 19 from the tank 18a and the tank 18b at different timings from each other (compression step S7). As a result, the down time of the recovery apparatus 1 during the compression of the first gas G3 is reduced, so that the light-emitting gas L1 can be more efficiently recovered from the lamp 2.

Note that the first gas G3 may be simultaneously introduced into the high-pressure cylinder 19 from both the tank 18a and the tank 18b.

Although the example in which the chamber 3a and the chamber 3b are mainly used has been described above, the chamber 3c may be used as appropriate. Further, the chamber 3a and the chamber 3b, for example, may have different volumes. With this configuration, the chamber can be appropriately selected according to the volume of the tube body 21 of the lamp 2.

Figure 11:
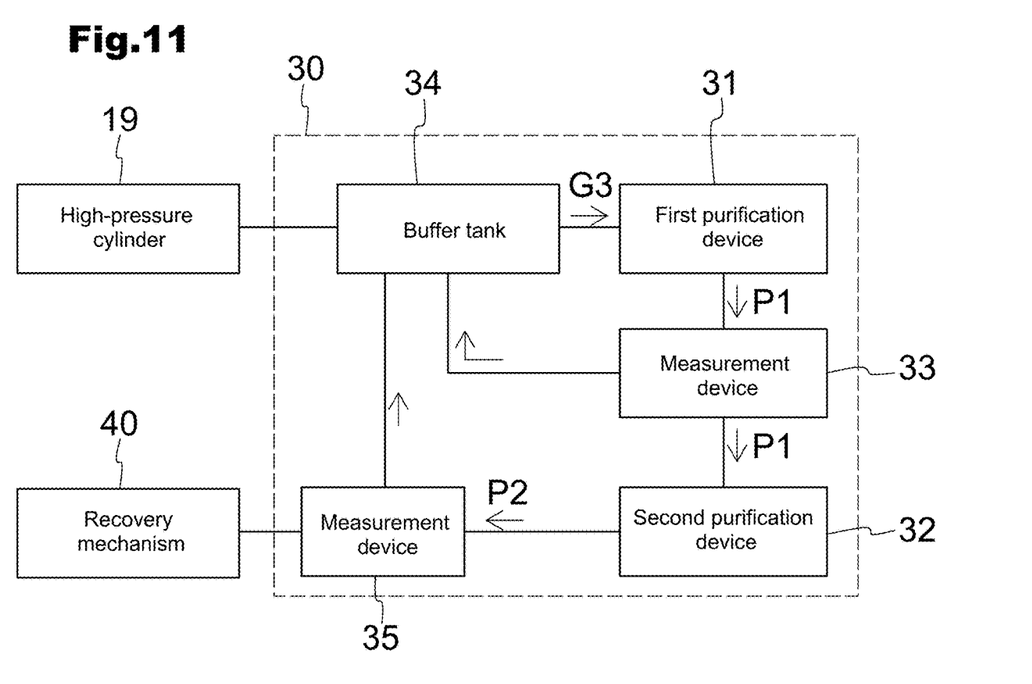
FIG. 11 is a diagram illustrating, in accordance with FIG. 8, a configuration of a recovery apparatus according to the modification.

<2>FIG. 11 is a diagram illustrating, in accordance with FIG. 8, a configuration of a purification mechanism 30 according to the modification. As illustrated in FIG. 11, the present modification includes a measurement device 35 that measures the concentration of a component contained in the first gas P2 at a subsequent stage of the second purification device 32.

From the viewpoint of storing the first gas P2 in the recovery mechanism 40 after the concentration of the component contained in the first gas P2 has been confirmed, a step of measuring the concentration of the component of the gas contained in the first gas P2 may be executed after the execution of step S84 (see also FIG. 9). As described above in the second embodiment, the concentration of the air-derived component contained in the first gas P1 is measured by the measurement device 33 (step S82). However, it is preferable to measure the concentration of the component contained in the first gas P2 for selecting the use of the recovered first gas P2.

Further, problems such as leakage from the second purification device 32 or pipes are also predicted. Therefore, if the concentration of the component contained in the first gas P2 is higher than a predetermined value, the first gas P2 may be introduced into the buffer tank 34, and purification by the first purification device 31 may be performed again as illustrated in FIG. 11. Although not illustrated, the first gas P2 after passing through the measurement device 35 can be introduced into the buffer tank 34 and the second purification device 32, and the first gas P2 can be selectively supplied to the buffer tank 34 or the second purification device 32 according to the measurement result of the measurement device 35.

<3> The purification step S8 may be executed after the solidification step S5 and before the compression step S7, and the first gas subjected to the purification step S8 may be compressed in the high-pressure cylinder 19.

<4> In the above description, the recovery mechanism 10 includes the tank 18 that cools and solidifies the first gas G1, and the recovery method 1a executes the solidification step S5 and the determination step S6. However, the present invention is not limited thereto. Specifically, the chamber 3 and the high-pressure cylinder 19 may be connected, and the first gas G1 pressurized by a pressurization mechanism (not illustrated) may be introduced into the high-pressure cylinder 19. Even when the first gas G1 is filled in the high-pressure cylinder 19 without being solidified, the discussion similar to that for the purification step S8 in the second embodiment can be applied.

<5> In the breaking step S4, the energy applied to the tube body 21 is not limited to physical energy. For example, thermal energy may be applied to the discharge tube remaining part 24 by a laser disposed in the chamber 3 to allow the internal space A1 of the chamber 3 and the internal space A2 of the tube body 21 to communicate with each other. In addition, a chemical may be brought into contact with the discharge tube remaining part 24 in the chamber 3, and the internal space A1 and the internal space A2 may be communicated with each other by chemical energy derived from a chemical reaction between the chemical and the discharge tube remaining part 24.

<6> In the above description, energy is applied to the discharge tube remaining part 24. However, in the present invention, any object is used as the object to which energy is applied as long as the internal space A1 and the internal space A2 can be communicated with each other without breaking the entire tube body 21. That is, the object to which energy is applied is not limited to the discharge tube remaining part 24.

For example, thermal energy may be applied to a portion of the tube body 21 different from the discharge tube remaining part 24 by irradiation of laser light to form a hole connecting the internal space A1 and the internal space A2 in a part of the tube body 21. The wavelength and intensity of the laser light can be appropriately adjusted according to the material, thickness, and the like of the tube body 21.

<7> In the above description, one lamp 2 is placed in one chamber 3, but a plurality of lamps 2 may be placed in one chamber 3.

<8>Although the lamp 2 is fixed to the placement surface 15a of the block 15 in the above description, it is only sufficient that the internal space A1 and the internal space A2 can be communicated with each other without breaking the entire tube body 21, and in the present invention, whether or not the lamp 2 is fixed in the chamber 3 may be freely selected.

<9> The present invention does not limit the use of the recovered light-emitting gas.

<10> The present invention is not limited to the above embodiments. The above embodiments can be combined as appropriate.

What is claimed is:

1. A light-emitting gas recovery method comprising:
    a step (a) of preparing a lamp to be discarded including a tube body filled with the light-emitting gas;
    a step (b) of placing the lamp to be discarded in an internal space of a chamber;
    a step (c) of reducing an air pressure in the internal space of the chamber;
    a step (d) of applying energy to a part of the tube body to allow an internal space of the tube body and the internal space of the chamber to communicate with each other without entirely breaking the tube body, and releasing the light-emitting gas from the internal space of the tube body toward the internal space of the chamber; and
    a step (e) of discharging a first gas present in the internal space of the chamber toward a recovery mechanism disposed outside the chamber after the step (d).

2. The light-emitting gas recovery method according to claim 1, wherein
    the lamp to be discarded includes a discharge tube remaining part protruding outward from an outer wall of the tube body, and
    the step (d) is a step of applying energy to the discharge tube remaining part to allow the internal space of the tube body and the internal space of the chamber to communicate with each other.

3. The light-emitting gas recovery method according to claim 2, wherein
    the lamp to be discarded includes a pair of electrodes arranged to be separated from each other in the tube body,
    the step (b) is a step of fixing the lamp to be discarded in the internal space of the chamber in a state where a direction in which the pair of electrodes is separated from each other is aligned with a substantially horizontal direction, and the discharge tube remaining part protrudes from the tube body when the tube body is viewed from vertically above, and the step (d) is a step of applying physical energy to the discharge tube remaining part by an impact applier moving substantially downward in a vertical direction and colliding with the discharge tube remaining part.

4. The light-emitting gas recovery method according to claim 1, further comprising a step (f) of purifying the first gas recovered by the recovery mechanism to increase a proportion of a noble gas component of the light-emitting gas contained in the first gas.

5. The light-emitting gas recovery method according to claim 4, wherein
the step (f) includes:
a step (f1) of reducing a proportion of an air-derived component contained in the first gas;
a step (f2) of measuring a concentration of oxygen contained in the first gas after the step (f1) is executed; and
a step (f3) of reducing a proportion of an impurity gas component different from the noble gas component in the light-emitting gas contained in the first gas that has undergone the step (f1) when a measurement result in the step (f2) is equal to or less than a predetermined threshold, and
the method returns to the step (f1) when the measurement result in the step (f2) exceeds the threshold.

6. The light-emitting gas recovery method according to claim 5, wherein
the step (f2) is a step of measuring concentrations of target substances each containing oxygen and at least any one kind belonging to the group consisting of nitrogen, water, and hydrogen,
the step (f3) is executed when a measurement result in the step (f2) is equal to or less than a threshold set for each of the target substances, and
the method returns to the execution of the step (f1) when the measurement result in the step (f2) exceeds the threshold set for each of the target substances.

7. The light-emitting gas recovery method according to claim 4, wherein
the lamp to be discarded is a xenon lamp,
the first gas discharged in the step (e) includes an impurity gas of at least one kind selected from the group consisting of oxygen, nitrogen, hydrogen, and water in a concentration of more than 2 ppm, and
the step (f) is a step of setting the concentration of the impurity gas contained in the first gas to 2 ppm or less.

8. The light-emitting gas recovery method according to claim 4, wherein
the lamp to be discarded is a halogen lamp,
the first gas discharged in the step (e) includes an impurity gas of at least one kind selected from the group consisting of oxygen, nitrogen, hydrogen, and water in a concentration of more than 10 ppm, and
the step (f) is a step of setting the concentration of the impurity gas contained in the first gas to 10 ppm or less.

9. The light-emitting gas recovery method according to claim 4, wherein
the lamp to be discarded is a high-pressure mercury lamp, an excimer lamp, a flash lamp, or a metal halide lamp,
the first gas discharged in the step (e) includes an impurity gas of at least one kind selected from the group consisting of oxygen, nitrogen, hydrogen, and water in a concentration of more than 5 ppm, and
the step (f) is a step of setting the concentration of the impurity gas contained in the first gas to 5 ppm or less.

10. The light-emitting gas recovery method according to claim 4, wherein
the recovery mechanism includes:
a first storage device that cools the first gas discharged from one or more chambers including the chamber, and holds the first gas in a solid state; and
a second storage device supplied with the first gas vaporized from the first storage device,
the step (e) includes:
a step (e1) of introducing the first gas from the chamber to the first storage device; and
a step (e2) of introducing the first gas obtained by vaporizing the first gas in a solid state held in the first storage device into the second storage device, and
the step (f) is a step of purifying the first gas held in the second storage device.

11. The light-emitting gas recovery method according to claim 10, wherein
the recovery mechanism includes a plurality of the first storage devices,
the second storage device is supplied with the first gas vaporized from each of the plurality of first storage devices and collectively hold the first gas,
the step (e1) is executed for each of the one or more chambers, and
the step (e2) is a step of introducing the first gas from the plurality of first storage devices to the second storage device at different timings.

12. The light-emitting gas recovery method according to claim 11, wherein, at a timing when the step (e1) is executed in one chamber of the one or more chambers, the step (c) is executed in another chamber of the one or more chambers.

13. A light-emitting gas recovery apparatus comprising:
a chamber;
a lamp placement unit on which a lamp to be discarded is placeable in an internal space of the chamber, the lamp including a tube body filled with a light-emitting gas;
an impact applier capable of applying physical energy to a part of the tube body of the lamp to be discarded when the lamp to be discarded is placed on the lamp placement unit;
a depressure unit that reduces an air pressure of an internal space of the chamber; and
a discharge port for discharging a first gas present in the internal space of the chamber, the discharge port being provided at a part of the chamber.

14. The light-emitting gas recovery apparatus according to claim 13, wherein,
when the lamp to be discarded includes a discharge tube remaining part protruding outward from an outer wall of the tube body,
the impact applier is capable of applying physical energy to the discharge tube remaining part of the lamp to be discarded when the lamp to be discarded is placed on the lamp placement unit.

15. The light-emitting gas recovery apparatus according to claim 14, wherein,
when the lamp to be discarded includes a pair of electrodes arranged to be separated from each other in the tube body,
the lamp placement unit includes a fixing mechanism capable of fixing the lamp to be discarded in a state where a direction in which the pair of electrodes is separated from each other is aligned with a substantially horizontal direction and the discharge tube remaining part protrudes from the tube body as the tube body is viewed from vertically above.

16. The light-emitting gas recovery apparatus according to claim 13, wherein a ratio of a volume of the chamber to a volume of the tube body of the lamp to be discarded is 100 or less.

\* \* \* \* \*